US006876648B1

(12) United States Patent
Lee (10) Patent No.: US 6,876,648 B1
(45) Date of Patent: Apr. 5, 2005

(54) INTERNET BASED TELEPHONE APPARATUS

(75) Inventor: Dae-Jin Lee, Seoul (KR)

(73) Assignee: UniData Communication Systems, Inc., Seoul (KR)

( * ) Notice: Subject to any disclaimer, the term of this patent is extended or adjusted under 35 U.S.C. 154(b) by 704 days.

(21) Appl. No.: 09/666,159

(22) Filed: Sep. 19, 2000

(30) Foreign Application Priority Data

Feb. 29, 2000 (KR) ........................................ 2000-10215

(51) Int. Cl.[7] .............................................. H04L 12/66
(52) U.S. Cl. ...................................... 370/353; 370/352
(58) Field of Search ................................. 370/352, 353, 370/354, 355, 356

(56) References Cited

U.S. PATENT DOCUMENTS 5,654,957 A * 8/1997 Koyama ..................... 370/355
5,742,596 A * 4/1998 Baratz et al. ............... 370/356
6,389,119 B1 * 5/2002 McBride .................. 379/93.01

* cited by examiner

Primary Examiner—Phirin Sam
Assistant Examiner—Andrew Wahba
(74) Attorney, Agent, or Firm—Nixon Peabody LLP; Daniel S. Song (57) ABSTRACT

An internet based telephone apparatus for embodying a telephone-to-telephone type of internet based telephone, the apparatus having a gateway function where a communication is possible between a general telephone connected via PSTN with another internet based telephone connected through internet network without separate internet telephone gateway installed between the internet network and PSTN, and a dual channel communication function where a communication is possible by being connected to a third internet based telephone when there is a communication connection between a general telephone connected via PSTN and a second internet based telephone connected through internet network.

22 Claims, 7 Drawing Sheets

INTERNET BASED TELEPHONE APPARATUS

BACKGROUND OF THE INVENTION

1. Field of the Invention

The present invention relates to an internet based telephone, and more particularly to an internet based telephone apparatus adapted to enable a communication with a general analog telephone (hereinafter referred to as general telephone) through a public switched telephone network and with another internet based telephone through an internet network, and a communication between a general telephone connected via a public switched telephone network and a still another internet based telephone connected via an internet network.

2. Description of the Prior Art

The most important communication means in our daily life these days is telephone, and particularly, the telephone enjoys the highest position in communication with distant relatives or friends, or in business communication. However, an international communication, a general telephone combined with internet, so called "internet phone" is slowly replacing the general telephone.

The internet phone in practical use now can be largely classified into PC-to-PC, and PC-to-phone, and the most beneficial merit of the internet phone is that utility rate thereof is reasonably cheap, which is realized by packet transmission method.

Furthermore, the internet phone, utilizing a public internet network can provide service by connecting an internet dedicated line to an Internet Service Provided (ISP) and installing an internet phone equipment, such that service can be offered at a much lower investment capital compared with existing public telephone network even in network set-up.

An initial internet phone is a method by which voices are exchanged PC and PC are connected through an internet network and through microphone and speaker (headset), which was developed by vocaltes. The vocaltec method is that two people wanting to communicate via telephone connect to internet at the same time and communicate by connecting to internet server of voclatec through an identical program of vocaltec. At this time, an analog voice signal input from a microphone is changed into a digital signal at a program in PC and compressed (64K compressed to 5.3K, 6.3K and 8K by G723, G729 method), where, a voice signal packeted by utilizing transmission protocols such as H.323, RSVP, RTP/RTCP and the like is sent to PC of the other party through the internet network per packet, and the voice signal is programmatically decompressed by the PC of the other party to change the digitalized voice signal to analogue voice signal and to restore the voice through a speaker for communication therebetween.

However, communication quality of the PC-to-PC method has not achieved an expected result due to varied PC performance, state of internet line, performance of used program and the like. Still worse, there are other problems in that same program should be used by two people wanting to communicate and time should be pre-arranged for use of internet phone between the two limiting a full-scale use of the internet phone era.

As a result, a method has been developed connecting PC with a general telephone, that is, a corresponding program is installed at a PC to be connect to an internet network, and is again connected to Public Switched Telephone Network (PSTN) via equipment known as Internet Phone Gateway installed at a specific area to communicate with the general telephone (a telephone used in home and office via PSTN).

This method can be regarded as a much improved version in comparison with PC-to-PC method in that receiving party can communicate through the general telephone although a person communicating through PC can speak in the same way as that of PC-to-PC method. The aforementioned PC-to-PC method is all realized by internet method while the PC-to-phone method uses the internet method on the calling party and the existing telephone method on the receiving party. In other words, the IPG serves to connect the internet with the existing public telephone network.

However, there is a problem in that the existing public telephone network is used up to the receiving telephone, such that a calling person or a communication-brokering person should pay telephone charge for using the corresponding telephone network. There is another problem in that PC-to-phone method cannot be connected to the internet phone at the general telephone side.

In other words, the PC-to-phone method is beyond its capacity in replacing the existing telephone. After all, in order to substitute the current telephone method, phone-to-phone method is only alternative measure, and the phone-to-phone method calls for installation at corresponding area of Gateway for connecting the telephone network with internet network in order to use PC side of the abovementioned PC-to-phone method as telephone. That is, connection is made is order of public telephone network-internet-network-public telephone network for communication via telephone which can be embodied by the Gateway for enabling network connection between each network and signal detection. Because of this, equipment development named as internet phone Gateway is regarded as being important with program on PC no longer being considered as such, such that world renowned switchboard development companies are embarking on development of the Gateway. There still remain may things to be solved such as equipment of excellent performance, large capacity of internet backbone network, further advanced protocol and the like. However it is questionable whether to place an international telephone call at a city phone rate because the telephone-to-telephone method for embodying the internet phone by way of general telephone calls for installment of high-priced equipment named as internet phone Gateway.

SUMMARY OF THE INVENTION

The present invention is disclosed to solve the aforementioned problems and it is an object of the present invention to provide an internet based telephone apparatus adapted to embody a full telephone-to-telephone method of internet phone.

It is another object of the present invention to provide an internet based telephone apparatus adapted to enable an internet based telephone to communicate with a general telephone via a public switched telephone network and also to enable the internet based telephone to communicate with other internet based telephones through internet network.

It is still another object of the present invention to provide an internet based telephone intrincally having a Gateway function adapted to enable a communication between a general telephone connected via a public switched telephone network and another internet based telephones connected via the internet network without separate installation of internet phone Gateway between the internet network and the public switched telephone network.

It is still further object of the present invention to provide an internet based telephone apparatus intrically having a dual channel communication capacity adapted to allow a general telephone to get an access to a third internet based telephone for communication thereto while a communication is performed between the general telephone connected via the public switched telephone network and a second internet based telephone connected via the internet network.

In accordance with one object of the present invention, there is provided an internet based telephone apparatus, the apparatus comprising:

voice input/output means for inputting and outputting a user's voice and voice signal of the opposite party;

first signal converting means for converting the user's voice to a digital voice signal;

transmitting/receiving means for forming a first communication route with a telephone of a first opposite party through internet network, packeting the user's digital voice signal to send same to the telephone of the first opposite party through the first communication route and for including a voice signal from the telephone of the first opposite party received through the first communication route;

control means for controlling the transmitting/receiving means; and second signal converting means for converting the decomposed voice digital signal to an analogue signal to output same to the voice input/output means.

In accordance with another object of the present invention, there is provided an internet based telephone apparatus, the apparatus comprising:

a public switched telephone network (PSTN) connection means for forming a communication route with PSTN and third signal converting means for converting analogue signal including analogue voice signal from the PSTN to a digital signal, whereon the transmitting/receiving means further comprises fourth signal converting means for forming a second communication route with a telephone of a second opposite party through internet network, packeting a digital voice signal from the third signal converting means to send same to the telephone of the second opposite party through the second communication route, decomposing packet data including the voice signal from the telephone of the second opposite party received through the second communication route, and converting the decomposed voice digital signal from the second communication route to an analogue signal to output same to the PSTN connection means through the PSTN.

BRIEF DESCRIPTION OF THE DRAWINGS

For fuller understand of the nature and objects of the invention, reference should be made to the following detailed description taken in conjunction with the accompanying drawings in which.

DETAILED DESCRIPTION OF THE INVENTION

Now, preferred embodiment of internet based telephone communication apparatus according to the present invention will be described in detail with reference to the accompanying drawings.

Figure 1:
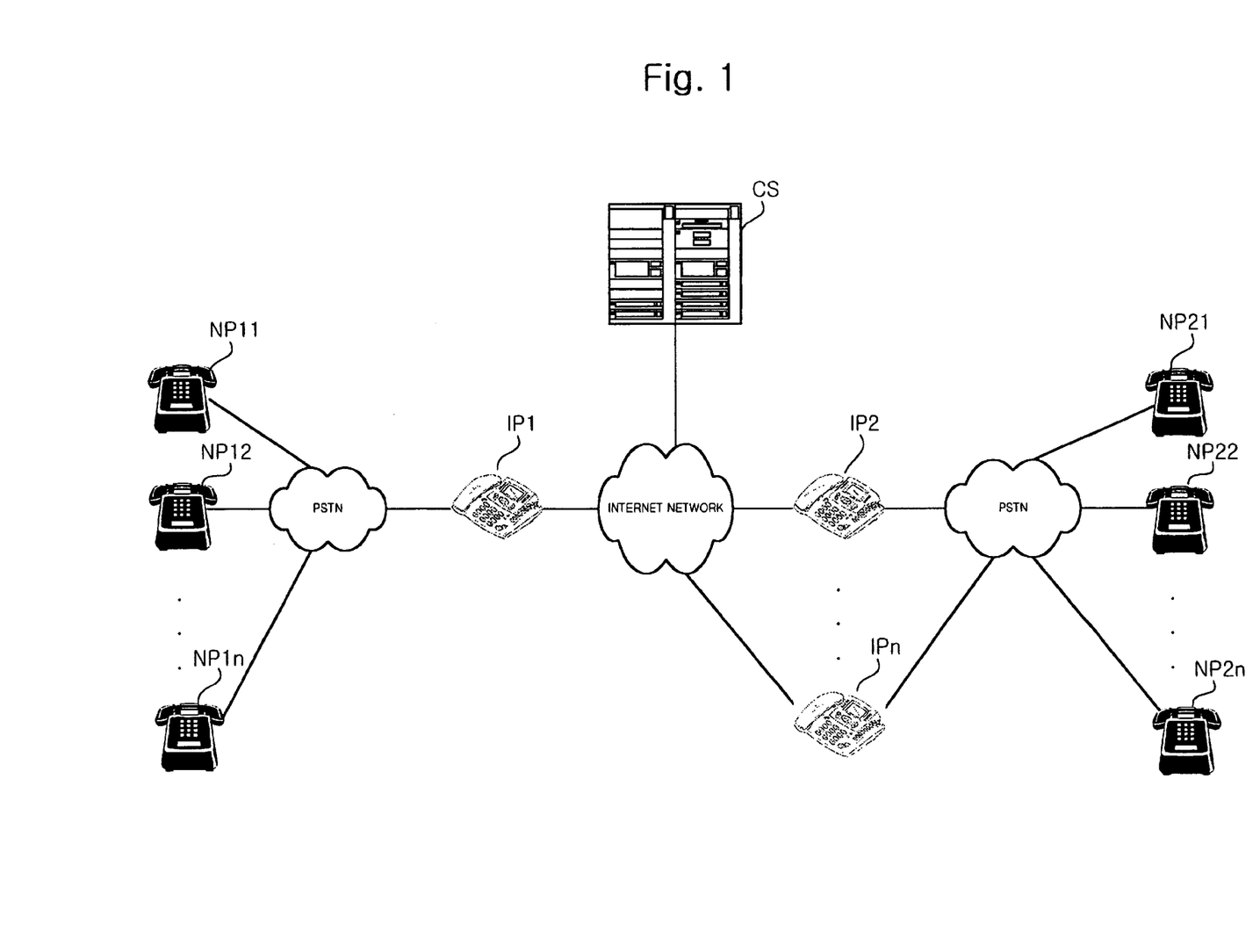
FIG. 1 is a schematic diagram for illustrating an entire concept of internet based telephone apparatus according to the present invention.

FIG. 1 is a schematic diagram for illustrating an entire concept of internet based telephone apparatus according to the present invention, where a plurality internet based telephones (IP1~IPn) are mutually connected via internet network and the internet network is connected with a call server (CS) for relaying the communication of the internet based telephones (IP1~IPn). Furthermore, each internet based telephones (IP1~IPn) is connected to general telephones (NP11~NP1n, NP21~NP2n) through PSTN.

Figure 2:
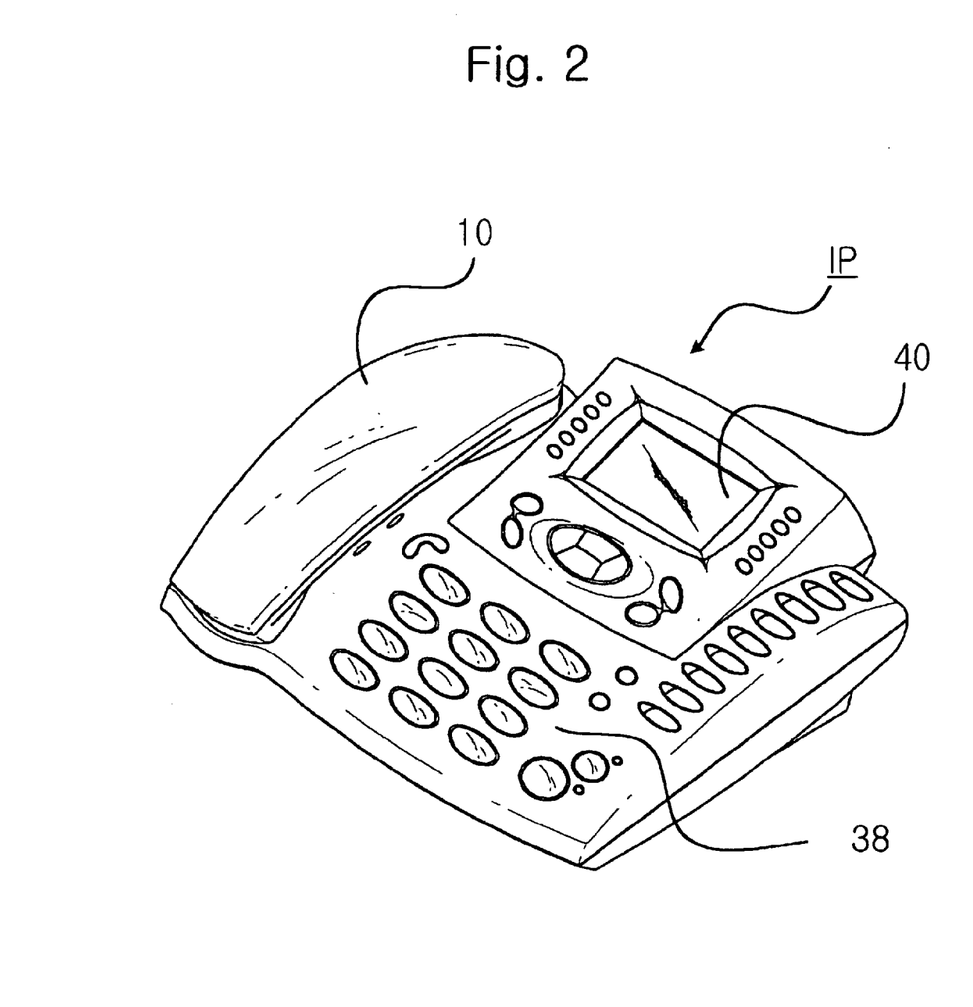
FIG. 2 is a schematic external perspective view of an internet based telephone according to the present invention.

FIG. 2 is a schematic external perspective view of an internet based telephone according to one embodiment of the present invention, where the internet based telephone includes a handset for making and receiving a phone call, a keypad having a number key for inputting telephone numbers and the like and a function key for executing various functions, a speakerphone, and a digital network connection terminal having a headset connection terminal, telephone line connection terminal, LAN and the like.

Figure 3:
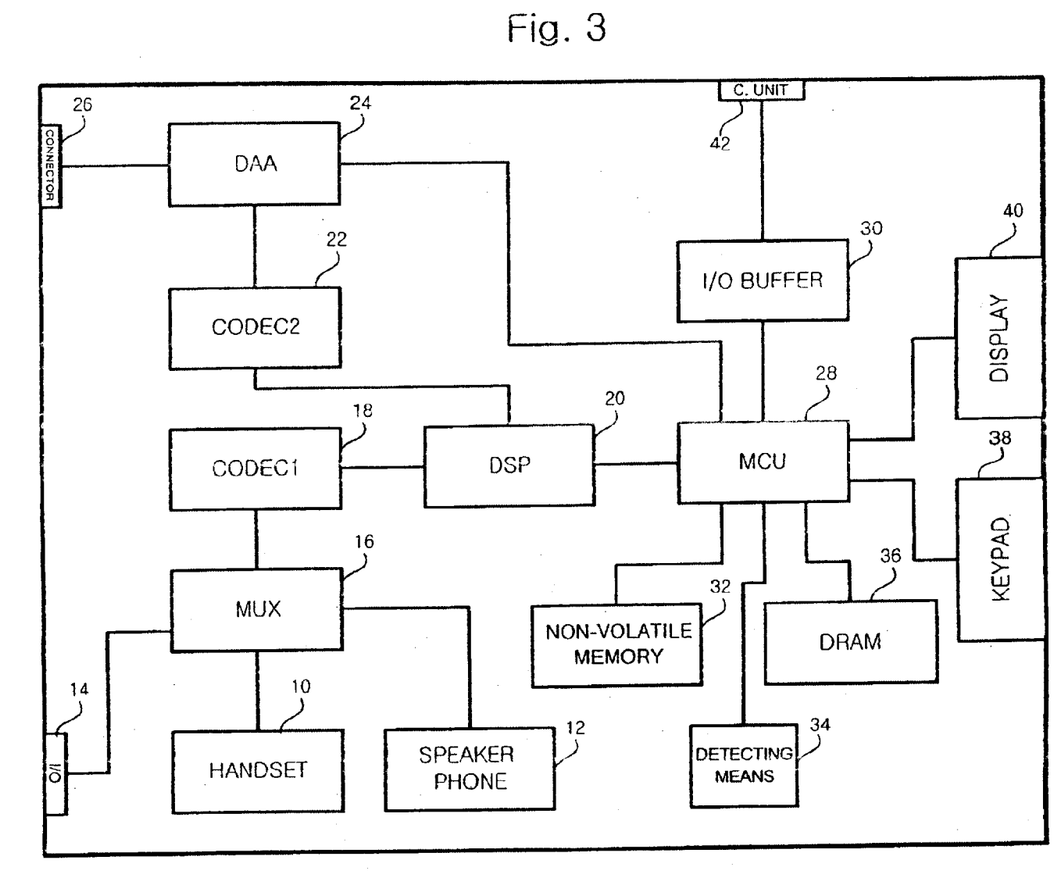
FIG. 3 is a block diagram of principal circuit structure of an internet based apparatus according to the present invention.

FIG. 3 is a block diagram for illustrating principal circuit structure of one embodiment of an internet based telephone according to the present invention, where the internet based telephone according to the present embodiment includes analogue voice input/output means, first signal converting means, coding/decoding means, central processing means (MCU), digital network connecting means, data storing means, key input means, display means and communication intention detecting means.

The analogue voice input/output means includes an external voice input/output connecting unit 14 for connecting an external voice input/output device having a handset 10, a speakerphone 12, a headset and the like, and a multiplexer (MUX) 16 for selectively changing the communication of voice input/output devices 10, 12 and 14.

The first signal converting means serves to convert an analogue voice signal input from the voice input/output means to a digital signal and includes a first CODEC (18, CODEC1) for converting a digital signal for the coding/decoding means to an analogue signal.

The coding/decoding means serves to compress and code a digital voice signal of a caller input from the first CODES (18, CODEC1) and includes a digital signal processor (DSP.20) for performing functions of stretching and decoding a compressed coded signal of other party input through central processing means (described later), generating a digital tone signal corresponding to a dual tone multi frequency (DTMF) signal according to control of central processing means (described later), discriminating an input tone signal, and erasing echo voice.

The digital signal processor 20 utilizes, by way of example, G.711, G.723, G.726, G.727, G.728 and G.729 methods to perform signal compression coding and signal stretching decoding.

The central processing unit (MCU) as central processing means takes charge of utilizing, by way of example, H.323 protocol to register of own internet based telephone at a call server (CS), establishing a communication route through call signaling such as communication request or the like with other internet based telephone, packeting the voice coded signal compressed by the digital signal processor 20 (packetizer processing), decomposing the packeted voice coded signal input from the digital newwork connecting means (depacketizing processing) and controlling an entire telephone according to the present invention.

The digital network connecting means includes an input/output buffer 30 for serially outputting transfer signal transmitted from the central processing unit (MCU 28) through a digital network connecting unit 42 for connecting to a digital network such as Local Area Network LAN or Wide Area Network WAN connected to the internet network, and simultaneously transferring to the MCU 28 by packet unit the serial data input from the digital network connecting unit 42 via from the internet network via LAN or WAN, and the digital network connecting unit 42 comprising RJ-45 as registered jack for connecting to a digital network such as LAN or WAN.

The data storing means serves to store control program of MCU 28 and includes non-volatile memory 32 for enabling read and write, a Dynamic Random Access Memory DRAM 36 for storing various data, a flash memory (not shown) and the like. Furthermore, the key input means includes a number key for inputting telephone numbers and the like and a key pad 38 provided at an external appearance of telephone for containing various functional keys and transmits to MCU 28 input signal generated by key input of a user. The display means includes a liquid crystal panel for displaying a set-up state of telephone according to the present invention or operational state according to control of MCU 28. The communication intention detecting means 34 detechs hook on/off state of handset 10 at the telephone according o the present invention, operational state of speakerphone, operational state of external voice input/output connecting unit 14 to transmit same to MCU 28.

At this time, the H.323 protocol basically uses TCT/IP Transmission Control Protocol/Internet Protocol), where the TCP/IP assists TCP and UDP (User Datagram Protocol) applicable at application. In MCU 28, UDP is used in call signaling process with call server (CS), TCP is used in call signaling process with other internet telephone and RTP (Real-time Transport Protocol) is used in transmission of voice data. The RTP uses UDP to be transmitted to network.

First of all, UDP process of MCU 28 during transmission of call signaling message to call serves (CS) will be described.

The UDP puts the call signaling message to UDP header including a port number of application of opposite party (namely, call server) and own (self) port number of application to transfer same to IP layer in packet from. The IP layer adds IP header containing own IP address and IP address of opposite party (namely, call server) to transfer same to ethernet device driver in packet form. The Ethernet device driver puts Ethernet protocol (by way of example, IEEE 802.2/802.3 protocol) header to transform same to packet of communication protocol form with local gateway connected via LAN and to output same to input/output buffer 30.

Meanwhile, in UDP process of MCU 28 during call signaling message receipt from the call server (CS), packet is decomposed in the reverse order of transmission process thus described, own (self) header per layer is utilized to discriminate whether transmitted data is right data and to erase the own data for transmitting the packet to upper layer.

Now, TPC process of MCU 28 during transmission of call signaling message to other internet telephone will be described.

TCP puts the call signaling message to a TCP header containing a port number of application of opposite party (namely, internet based telephone of opposite party), a port number of own application and transmission confirmation field to transmit same to IP layer in packet form, where the IP layer adds an IP header containing self (own) address and IP address of opposite party (namely, internet based telephone of opposite party) to transmit same to Ethernet device driver in packet form. The Ethernet device driver puts Ethernet protocol (by way of example, IEEE 802.2) to transform same as packet form and to output to the input/output buffer 30.

Meanwhile, UDP process of MCU 28 during receipt of call signaling message from internet based telephone of opposite party is done in reverse order of the above-mentioned transmission process.

Now, RTP process of MCU 28 during transmission of voice data with other internet based telephone will be described.

RTP puts and transmits a compressed decoded voice data to an RTP header including voice data format and sequence number and the like, and UDP puts an UDP header a port number of application of opposite party (namely, internet based telephone) and port number of self (own) application to transmit same to IP layer in packet form.

The IP layer adds an IP header containing own (self) IP address and IP address of opposite party (namely, internet based telephone of opposite party) to transmit same to Ethernet device driver in packet form. The Ethernet device driver puts Ethernet protocol (by way of example, IEEE 802.2) to transform in packet form and to output same to input/output buffer 30. Meanwhile RTP process of MCU 28 during receipt of voice data from internet based telephone of opposite party is done in revere order of the aforementioned transmission process.

When the system according to the present invention is constructed utilizing the internet based telephone thus described, phone-to-phone internet phone can be embodied among internet based telephone through the internet network.

Meanwhile, the internet based telephone shown according to the present invention can be constructed by further including PSTN connecting means and second signal transforming means to the aforementioned construction.

The PSTN connecting means, a Registered Jack RJ for connecting telephone lines, includes a telephone line connector 26 comprising, by way of example, RJ-11 and a Data Access Arrangement DAA (26) for detecting ring signal from external telephone lines and for performing hook ON/OFF with external telephone lines according to control of MCU 28 and separation/composition of analogue transmitted and received voice signal.

The second signal transforming means includes a second CODEC (CODEC2) (22) transforming an analogue voice signal from general telephone signal-separated from the DAA (24) to a digital signal and for transforming a digital signal from the digital signal processor 20 to an analogue signal.

At this time, signal transmission of the first and second CODEC 18 and 22 and the digital signal processor 20 is realized by time slot method, where the digital signal processor 20 compreses and codes voice signals from the first CODEC 18 and the second CODEC 22 out of two channels to transmit same to MCU 28.

The time slot method, a method where, by way of time-sharing way, one signal line receives and transmits various signals at the same time, and signal transmission/reception between the first CODEC 18 and digital signal processor 20, and signal transmission/reception between the second CODEC 22 and digital signal processor 20 are respectively realized in different time slots, where MCU 28 divisionally sends signals transmitted from each channel of digital signal processor 20 to respectively-requested IP addresses of opposite party. Furthermore, the digital signal processor 20 further includes functions of monitoring communication of general telephone connected via PSTN and of detecting DTMF tone signal input from the general telephone.

As mentioned above, when the internet based telephone is constructed thus described various communications are possible including communications with other internet based telephones, with a general telephone through PSTN, between a general telephone connected via PSTN and other internet based telephones connected through intern network, and communication with other internet based telephone and simultaneously communication with a general telephone connected via PSTN to still other internet based telephone connected via internet network.

Next, operations of internet based telephone according to the present invention thus constructed will be described in detail.

First of all, log-in operation of internet based telephone according to the present invention will be described.

When a user activates an internet based telephone according to operation such as power input or the like, MCU 28 presses through an initialized operation and loads on TCP/IP a log-in message including a terminal identifying code (by way of example, serial number of product) previously stored along with a domain code of call server (CS, see FIG. 1) to send same to the call server (CS, see FIG. 1) through input/output buffer (30) and request registration of its own. When a log-in registration confirmation is received from the call server (Cs), a state is obtained where a normal internet based telephone communication can be performed.

Next, internet based telephone communication mode according to the present invention will be described.

The mode according to the present invention is classified into a general telephone communication mode, internet based telephone communication mode and gateway communication mode.

The general telephone communication mode is a mode communicable with general telephone through PSTN just like the general telephone. The internet based telephone communication mode is classified into a first internet based telephone communication mode communicable with a certain internet based telephone according to communicating request by another internet based telephone, a second internet based communication mode communicable with general telephone via internet based telephone of opposite party and a third internet based communication mode communicable according to communication request by another internet based telephone. The gateway communication mode is divided into a first gateway communication mode communicable with another internet based telephone with a general telephone through a certain internet based telephone, a second gateway communication mode communicable from a general telephone through a certain internet based telephones and another internet based telephone to another general telephone and a third gateway communication mode communicable with a general telephone from another internet based telephone through a certain internet based telephone Establishing method of the general telephone communication mode and internet based telephone communication mode can cite a method for using a voice guide message priorly stored in non-volatile memory 32.

First of all, a method will be described where a user utilizes a certain internet based telephone to set up a general telephone communication mode and internet based telephone communication mode.

When the user activates the voice input/output device (10, 12 or 14) to a communicable state, the activated state is detected by communication desire detecting unit 34 to be input to MCU 28, where the MCU 28 outputs a voice message for guiding mode set-up and dialing method previously stored in the non-volatile memory 32.

At this time, the voice guide message requires a particular key input through the key pad 38 relative to the general telephone communication mode and internet based telephone communication mode.

In case of key input of the general telephone communication mode, a voice message is output calling for input of telephone number of opposite party. When the user inputs a desired telephone number of the opposite party, the MCU 28 performs a dialing operation of general telephone communication mode according to input telephone number.

Meanwhile, in case of key input of internet based telephone communication mode, a voice message is requested calling for a particular key input via the key pad 38 relative to the first internet communication mode and second internet communication mode. In case of key input of the first internet communication mode, the MCU 28 requests an input of identification number of opposite party's internet based telephone through the sound message and in case of key input of second internet communication mode, the MCU 28 requests an input of identification number (by way of example, telephone number) of opposite party's general telephone and identification number of opposite party's internet based telephone through the sound message. The MCU 28 then establishes the first internet communication mode or second internet communication mode according to a key input signal from the key pad 38.

Next, set up methods of general telephone communication mode and gateway communication mode will be described in case a user uses the general telephone to connect to the internet based telephone through PSTN.

First of all, when the user utilizes the general telephone to connect same to an internet based telephone, the MCU 28 at the internet based telephone recognizes the connection and outputs a voice message for guiding mode set-up previously stored in the non-volatile memory 32. At this time, the voice guide message requires a specific key input through key pad against the general telephone communication mode and the gateway communication mode. The MCU 28 then discriminates whether the communication request from the general telephone is a general telephone communication or gateway communication with a certain internet based telephone according to the key input signal from the general telephone.

As a discrimination result of the key input signal if the communication request is the general telephone communication mode, the MCU 28 sets up the general telephone communication mode to activate a bell signal generator (not shown), notifying that there is a communication connection request at the certain internet based telephone.

Meanwhile, as a discrimination result of the key input signal, if the communication request is the gateway communication mode, the MCU 28 outputs to the connected general telephone a voice message requesting a specific key input against first and second gateway communication modes. The MCU 28 again discriminates whether the communication request from the general telephone is the first gateway communication mode or second gateway communication mode according to the key input signal from the general telephone.

As a discrimination result, if the communication request is a key input of the first gateway communication mode, the MCU 28 requests an input of identification number of internet based telephone of opposite party via voice message, and in case of key input from the second gateway communication mode, the MCU 28 requires through the voice message an input of identification number of opposite party's internet based telephone and telephone number of opposite party's general telephone.

Successively, a tone signal by the key input from the general telephone is detected from the digital signal processor 20, and detected result if transmitted to the MCU 28, which in turn sets up first gateway communication mode or second gateway communication mode Explanation about the third gateway communication mode is omitted here and described later at (3.3).

Next, operation of the internet based telephone according to the present invention will be described in detail for every operation mode.

1. General telephone communication mode

Figure 4:
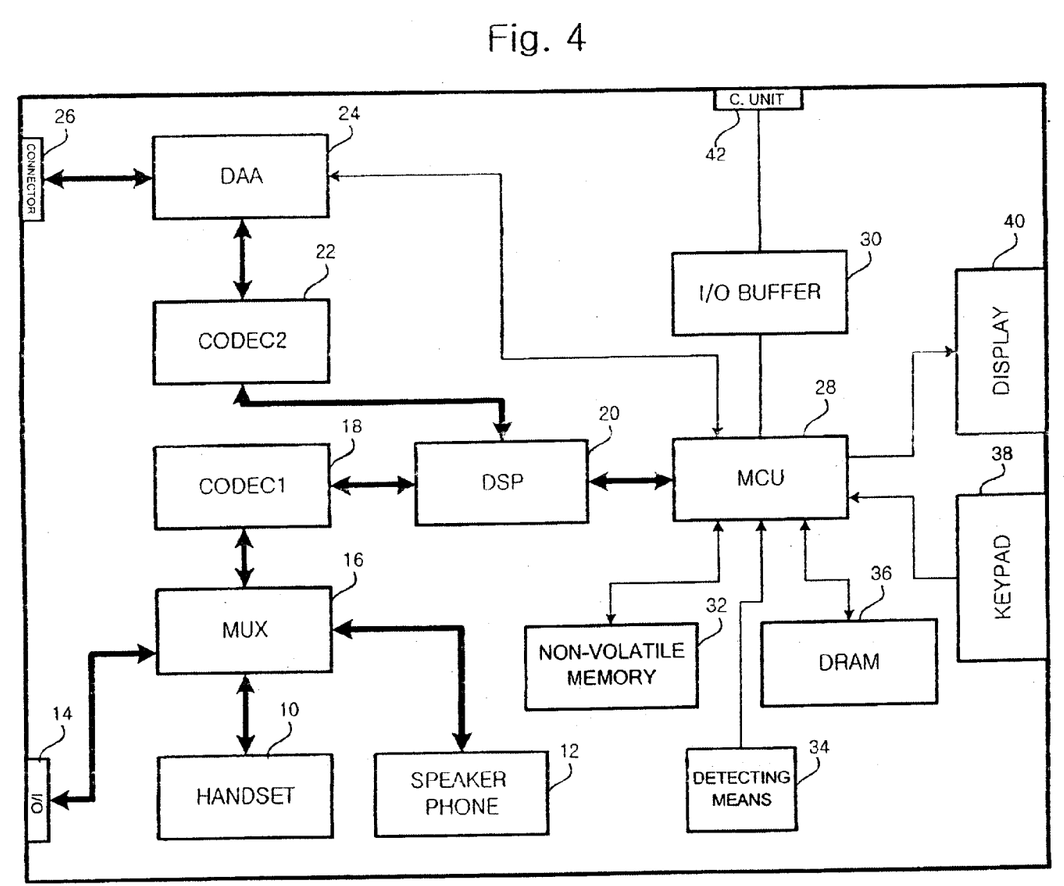
FIG. 4 is a signal flow chart of a general telephone communication mode in an internet based telephone according to the present invention.

First of all, a general telephone communication mode through PSTN will be described with reference to FIGS. 1 and 4.

1.1. Communication from internet based telephone to general telephone First of all, when a user uses an internet based telephone (IP1) to communicate with a general telephone (by way of example, NP12) as in FIG. 1, the user activates the voice input/output device (10, 12 or 14) to a communication state and the activated state is detected by communication desire detector 34 to be applied to the MCU 28. it is presumed thereafter that a communication mode of general telephone has been set up by the user according to methods such as voice guide and the like.

Successively, the MCU 28 controls the DAA 24 for a connectable state with PSTN. In other words, the digital connection arranger 24 is set up at hook off mode. When a telephone number of a telephone (by way of example, NP12) desired for communication with key pad 38 is input, the MCU 28, controls the digital signal processor 20 in order to generate a digital signal corresponding to DTMF tone of input telephone number. The digital tone signals is transformed into an analogue signal at the second CODEC 22 to be sent to a switchboard of PSTN network through the DAA 24 and telephone line connector 26. A communication route with the general telephone (NP12) is formed by a communication route forming process between the switchboard and the general telephone (by way of example, NP12). In the communication route set-up process with the general telephone thus described, the MCU 28 controls to form a communication route connecting the DAA 24→second CODEC 22→digital signal processor 20→MCU 28→digital signal processor 20→first CODEC 18→voice input/output device, such that a ringing tone output to the communication route and a signal returning from the switchboard can be sent to the user.

Successively, user's signal is changed to a digital signal at the first CODEC 18 and coded by the digital signal processor 20 to thereafter be input into MCU 28.

At this time, the MCU 28 returns the coded signal to the digital signal processor 20 for decoding and outputs same to the second CODEC 22 because the MCU 28 knows that the sound signal is a communication through the PSTN. The use's decoded sound signal is changed into an analogue signal at the second CODEC 22 to be transmitted to the general telephone (NP12) via data connection arranger 24, telephone line connector 26 and PSTN.

At the same time, the opposite party's voice signal output from the general telephone (NP12) is input through the telephone connector 26 and the DAA 24 to be transformed into a digital signal at the same CODEC 22, coded at the digital signal processor 20 and is sent to the MCU 28. Even at this time, the MCU 28 returns the coded signal to the digital signal processor 20 for decoding to output same to the first CODEC 18 because the MCU 18 knows that the voice signal is a communication (general telephone communication mode) through PSTN.

Thereafter, the opposite party's decoded voice signal is transformed to an analogue signal at the first CODEC 18 to be output to the voice input/output device (10, 12 or 14) through the multiflexer 16. Through this process, a communication is realized with the general telephone via PSTN.

Successively, when the user activates the voice input/ output device (10, 12 or 14) to a communication completion state, the activated state is detected by the communication desire detector 34 to be applied to the MCU 28. The MCU28 then controls the DAA 24 to complete the connection with PSTN network (in other words, the DAA 24 is set up at a hook-on mode), such that the communication mode through PSTN is finished.

1.2. Communication from general telephone to internet based telephone

Next, a communication connection to the internet based telephone (IP1 in FIG. 1) from general telephone (by way of example NP12 in FIG. 1) through PSTN will be described.

First of all, a ring signal input through the telephone line connector 26 is detected by the DAA 24, where the DAA 24 notifies the detection of the ring signal to the MCU 28.

The MCU 28 controls such that the data connection arranger 24 comes into the hook-off mode and outputs a voice guide message (for confirmation as to where the message is a communication request with a certain internet based telephone or with other internet based telephone) previously stored in the memory means to the digital signal processor 20, second CODEC 22, DAA 24 and the telephone line connector 26.

When the other party manipulates a key pad of telephone (NP12) according to the voice guide message, a DTMF tone signal is generated, which is in turn transformed to a digital signal at the second CODEC 22 via the DAA 24 to thereafter be input to the digital signal processor 20.

The digital signal processor 20 detects the digitalized tone signal to discriminate to which key input the tone signal corresponds, and notifies same to the MCU 28.

The MCU 28 discriminates the type of connection request of opposite party's telephone (NP12) according o the discriminate result at the digital signal processor 2, namely, discriminates whether the connection request is a communication request with a certain internet based telephone (in other words, general telephone communication mode) or with other internet based telephone. Here, it is presumed that the connection request of the opposite party's telephone (NP12) is a communication request with a certain internet based telephone (general telephone communication mode).

Successively, the MCU 28 activates a bell signal generator (not shown), by which the user recognizes that there is a communication request (general telephone communication mode) to activate the voice input/output device (10, 12 or 14) to a communicable state. The state is then detected by the communication desire detector 34 to be applied to the MCU 28.

There is formed a communication route in the MCU 28 in the order, or reverse order of voice input/output means—first CODEC 18—digital signal processor 20—MCU 28—digital signal processor 20—second CODEC 22—DAAW 24—telephone line connect connector 26, as illustrated in (1.1).

Subsequent operations are the same as described in (1.1) such that descriptions thereto will be omitted.

2. Internet based telephone communication mode

Figure 5:
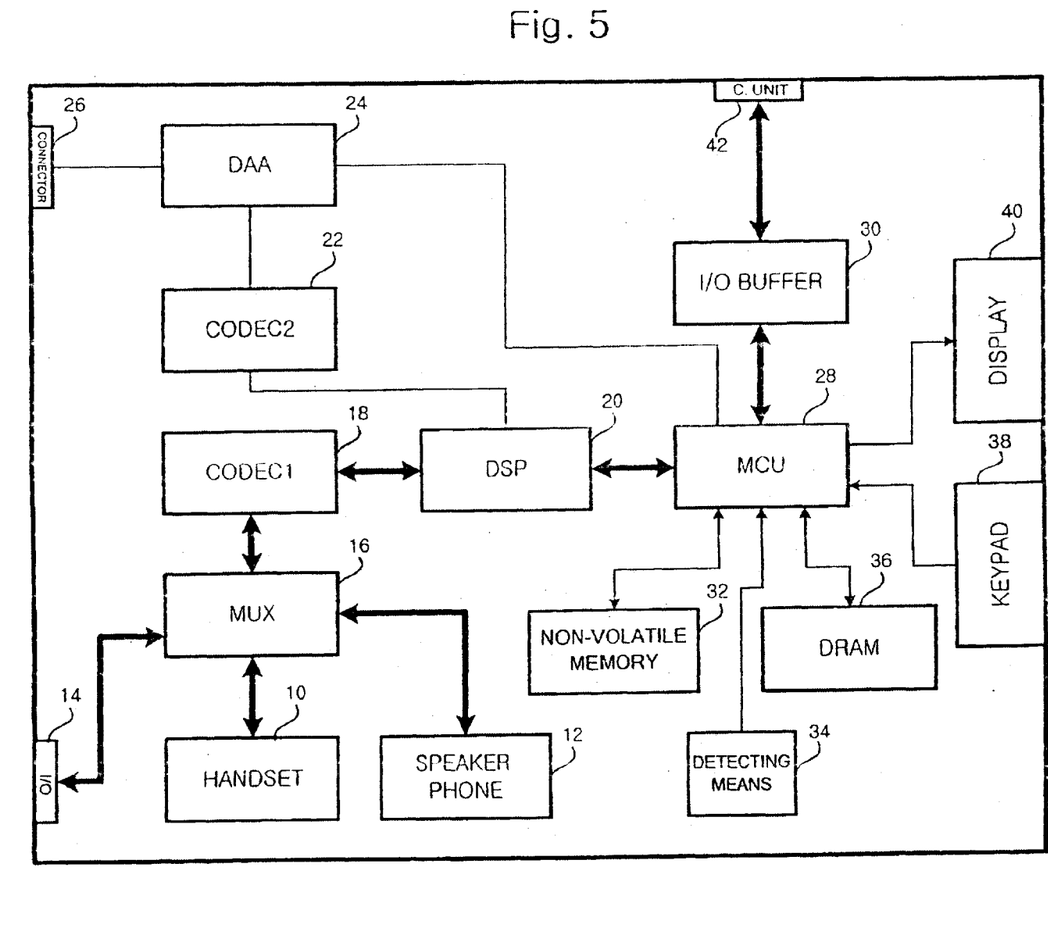
FIG. 5 is a signal flow chart of internet based telephone communication mode in an internet based telephone according to the present invention.

Now, internet based telephone communication mode through internet network will be described with reference to FIGS. 1 and 5.

2.1. Communication to other internet based telephone (first internet communication mode)

First of all, when a user wants to communicate from a certain internet based telephone (by way of example, IP1) to another internet based telephone (by way of example, IP2), and when the user activates the voice input/output device (10, 12 or 14) to a communicable state, the state is detected by the communication desire detector 34 to be input to the MCU 28.

It is assumed thereafter that a communication mode to another internet based telephone is set up by the user according to methods such as voice guide and the like. The MCU 28 uses UDP protocol to transport an admission request message including an identification number (by way of example, "202") of the opposite party's internet based telephone input by the user to the call server (CS, see FIG. 1) through the input/output buffer 30.

Successively, when an admission confirmation message is received from the call server (CS) including an IP address relative to the internet based telephone (IP2) of opposite party, the MCU 28 uses a related IP address to utilize TCP protocol for exchange of call signaling message in order to secure a communication channel through the internet based telephone (IP2) of the opposite party and the internet network.

In the internet, exchange of the call signaling message is realized between the call server (CS) and the internet based telephone (IP2) of the opposite party, and at this time the call server (CS) transports to the internet based telephone (IP2) information indicating that communication destination of the internet based telephone (IP1) is the internet based telephone (P2). Meanwhile, the MCU 28 controls the digital signal processor 20 to cause an imaginary ringing tone to be dispatched o the first CODEC 18 to relieve a use from tediousness, such that the user is made to be notified that a communication with the internet based telephone of opposite party is being tried through the voice input/output device (10, 12 or 14).

Successively, when a communication route to the internet based telephone (IP2) of the opposite party is secured, the MCY 28 controls the digital signal processor 20 to terminate generation of the imaginary ringing tone, Successively, voice signal of the user is converted to a digital signal by the first CODEC 18 and compressively coded by the digital signal processor 20 to thereafter be input to the MCU 28. At this time, the MCU 28, being aware of the fact that the signal is a communication (first internet based communication mode) through the internet network, utilizes RTP protocol to carry on TCP/IP the voice data packeted from compressively coded voice signal and to send same to the input/output buffer 30. The input/output buffer 30 outputs the packet voice data in series to data network connector 42. The output packet voice data I sent to the internet based telephone (IP2) of the opposite party via the internet network.

Meanwhile, the voice data signal from the internet based telephone (IP2) of the opposite party reaches the input/output buffer 30 in series by being carried on TCP/IP in packet format through the internet network, where the input/output buffer 30 transports the input serialized data to the MCU 28 per packet.

The MCU 28 decomposes RTP protocol packet data to confirm a transmission identification code (IP address and receipt identification code (IP address). The MCU 28 makes sure whether the corresponding packet voice data is transmitted from the internet based telephone of the opposite party paged by the inter based telephone (IP1) thereof and checks application port number and sends the decomposed compressed coded voice signal to the digital signal processor 20. Successively, the digital signal processor 20 stretches and decodes the compressed coded signal to output same to the first CODEC 18. The decoded voice signal of the opposite party is converted to an analogue signal by the first CODEC 18 to be output to the voice input/output device (10, 12 or 14) via multiplexer 16. A communication is realized with the internet based telephone through the internet network by the above-mentioned procedures.

When the user activates the voice input/output device (10, 12 or 14) to a communication termination state, the state is detected by the communication intention detector 34 to be input to the MCU 28. The MCU 28 utilizes TCP protocol to output to the internet based telephone (IP2) of the opposite party a call release message for advising that a call connection is released through the input/output buffer 30 and the internet network to terminate the internet based communication mode. The internet based telephone of the opposite party receives the connection release message to recognize that the communication has been terminated.

Meanwhile, when the MCU 28 receives the connection release message from the opposite party through the input/output buffer 30 before notifying the connection release message to the internet based telephone (IP2) of the opposite party, the MCU 28 controls the digital signal processor 20 to send an imaginary end tone to the firs CODEC 18, such that the user is made to recognize that the internet based telephone connection is terminated through the voice input/output device (10, 12 or 14).

2.2. Communication with general telephone via another internet based telephone (second internet based communication mode)

First of all, when a communication is made from the internet based telephone (IP2) to a general telephone (NP22) through another internet based telephone (by way of example, IP2), a user activates the voice input/output device (10, 12 or 14) to a communicable state, where the state is detected by the communication intention detector 34 to be applied to the MCU 28. It is presumed here that a communication mode to the general telephone (NP22) is established by the user through another internet based telephone (IP2) according to method such as the voice guide or the like, where the user inputs an identification number (by way of example, 202) of the internet based telephone (IP2) of the opposite party and an identification number of the general telephone (NP22) (by way of example, telephone number).

Successively, the MCU 28 sends to the call server (CS: see FIG. 1) through the input/output buffer 30 and internet network utilizing UDP protocol a communication connect request message including information indicating a communication request with the general telephone through the internet based telephone (IP2) of the opposite party and the identification number (by way of example 202) of the internet based telephone (IP2) of the opposite party input by the opposite party. At this time, the information indicating the communication request with the general telephone via the internet based telephone (IP2) of the opposite party can exemplify a particular number (by way of example, 9) pre designated with the call server and added before and after identification number of a telephone of he opposite party.

In other words, when a number such as 9202, 2029 or the like is sent to the call server (CS), the call server recognizes the particular number 9 to acknowledge that a communication with the general telephone is requested through the internet based telephone (IP2) of the opposite party.

Successively, when an admission confirmation message including an IP address to the internet based telephone (IP2) of the opposite party is received from the call server (CS), the MCU 28 uses the corresponding IP address to exchange call signaling message by way of TCP protocol in order to secure a communication channel through the internet based telephone (IP2) of the opposite party and the internet network. In the intervening course, transmission and receipt of the call signaling message between the call server (CS) and the internet based telephone (IP2) of the opposite party are made, where the call server (CS) sends to the internet based telephone (IP2) information indicating that communication destination of the internet based telephone (IP1) is a general telephone via the internet based telephone (IP2).

The MCU 28 transmits an information message including telephone number of general telephone (NP22) at receiving end to the internet based telephone (IP2) through the input/output buffer 30 and internet network utilizing TCP protocol, while the internet based telephone (IP2) which has received the information message establishes a communication route with the general telephone (NP22) according to gateway function to be described later at chapter (3).

Meanwhile, the user can listen to the imaginary ringing tone through the voice input/output device (10, 12 or 14) according to control of the MCU 28 even during the period the communication route is being established. Successively, when the communication route is secured with the general telephone (NP22) through the internet based telephone (IP2) of the opposite party, the MCU 28 controls the digital signal processor 20 to terminate the generation of imaginary ringing tone. The voice signal of the user is converted to a digital signal by the first CODEC 18 and compressively coded by the digital signal processor 20 to be supplied to the MCU 28. At this time, the MCU 28, being aware of the fact that the signal is a communication (second internet based communication mode) through the internet network, sends to the input/output buffer 30 a voice data packeted from the compressed coded voice signal by using RTP protocol, where the input/output buffer 30 transports the packeted voice data to the internet based telephone (NP22) of opposite party via internet network as the packeted voice data is output in series. At this time, signal processing of the internet based telephone (IP2) of the opposite party and telephone at receiving end (NP22) is omitted for simplicity of explanation and detailed description thereto will be made at chapter (3).

Meanwhile, the voice data signal from the telephone (NP22) at receiving end via the internet based telephone (IP2) of the opposite party is loaded on TCP/IP in packet format to reach the input/output buffer 30 in series through the internet network, where receiving operation of the voice data is the same as that of the internet based telephone (IP1) at the first internet based communication mode of chapter (2.1.), such that explanation thereto is omitted.

Successively, when the user activates the voice input/output device d(10, 12 or 14)to a communication terminated state, the state is detected by the communication intention detector 34 to be applied to the MCU 28. The MCU 28 utilizes TCP protocol to send a call release message to the internet based telephone (IP2) of the opposite party through the input/output buffer 30 and the internet network and to terminate the internet based communication mode. Successively, the internet based telephone (IP2) of the opposite party receives the admission release message to recognize that the communication has been terminated, and generates an imaginary end tone to send same to the telephone (NP22) at receiving side. The user of the telephone (NP22) at the receiving end recognizes that the communication connection is released.

Meanwhile, when the MCU 28 receives the admission release message from the opposite party via the input/output buffer 30 before advising the admission release message to the internet based telephone (IP2) at the opposite party, the MCU 28 controls the digital signal processor 20 to output an imaginary end tone to the first CODEC 18, such that the user can recognize that internet based telephone connection is terminated through the voice input/output device (10, 12 or 14).

2.3. Communication request to other internet based telephone (third internet based communication mode)

Now, communication request for the internet based telephone (IP2) of the opposite party to the internet based telephone (IP1) will be described with reference to FIGS. 1 and 5.

When the MCU 28 of the internet based telephone (IP1) receives in TCP protocol format a call signaling message (in other words, call setup request message) from the internet based telephone (IP2) of the opposite party input through the input/output buffer 30, the MCU 28 analyzes an identification code of transmitter side (in other words, IP address of the internet based telephone (IP2) and an identification code of destination (in other words, IP address f internet based telephone (IP1) contained in the message to recognize that the currently-input call signaling message is a communication request between the internet based telephone (IP1) and internet based telephone (IP2), and performs an operation for securing a communication channel with the internet based telephone (IP2) of the opposite party through mutual internet network. In the intervening period, transmission and receipt of call signaling message with the call server (CS) is realized, where the call server (CS) transmits information that communication destination of the internet based telephone (IP2) of the opposite party is the internet based telephone (IP1). At this time, the MCU 28 activates a bell signal generator (not shown) to notify to the user that there is a communication request with the internet based telephone (IP1). Successively, when a communication route with the internet based telephone (IP2) of the opposite party is obtained, operation of the internet based telephone (IP1) is the same as shown in (2.1.), such that explanation thereto is omitted.

3. Gateway communication mode

Figure 6:
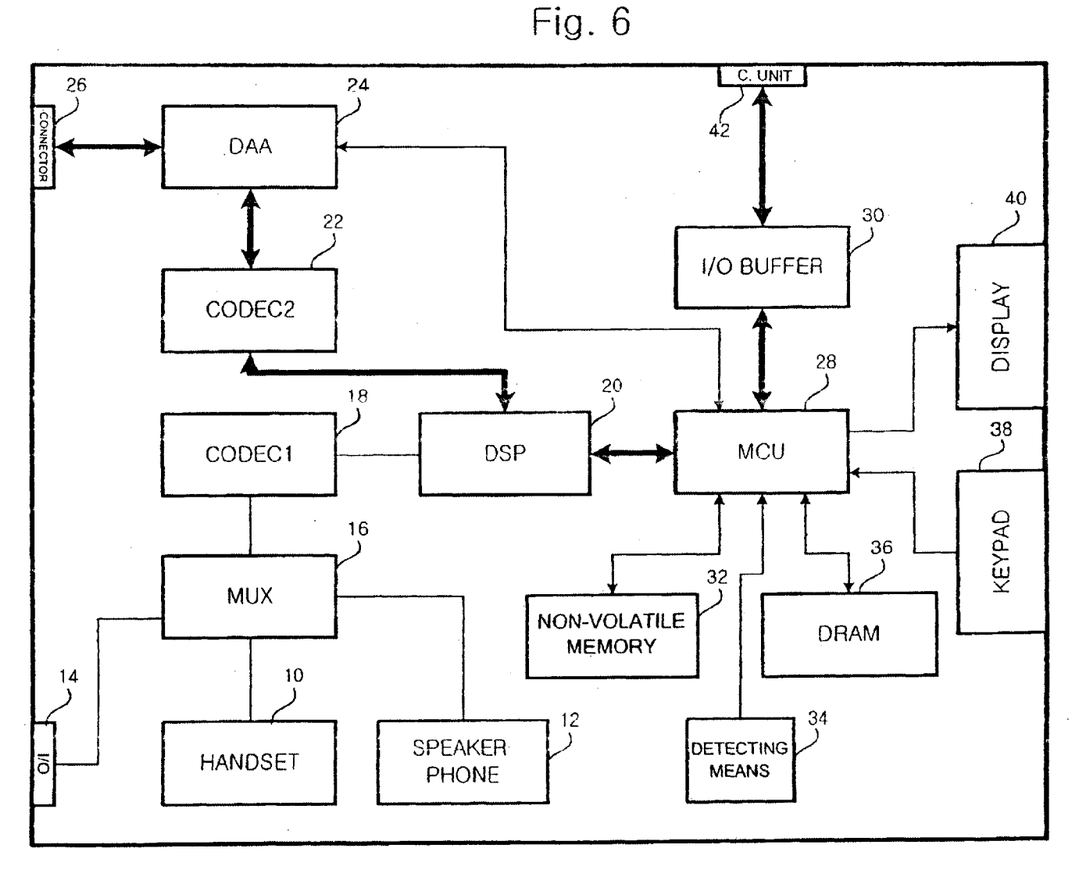
FIG. 6 is a signal flow chart of gateway mode for embodying a communication connection between a general analogue telephone connected to the internet based telephone shown in FIG. 1 via a public switched telephone network.

Referring to FIGS. 1 and 6, a gateway communication mode by way of communication request between general telephone and other internet based telephone will be explained.

3.1. Communication request from general telephone to other internet based telephone (first gateway communication mode)

Now, a communication connection to other internet based telephone (IP2) from a general telephone (by way of example, NP12 of FIG. 1) through PSTN and via the internet based telephone (IP1 of FIG. 1) will be described.

First of all, a ring signal input from a telephone line connector 26 is detected by data access arrangement (DAA 24), where the DAA 24 notifies the detection of the ring signal to the MCU 28. The MCU 28 so controls that the DAA 24 can be changed to a hook-off mode and outputs a voice guide message previously stored in memory means (for confirming whether the message is a communication request with MCU 28, a communication message with other internet based telephone or a communication request with other general telephone via the other internet based telephone) to the digital signal processor 20, second CODEC 22, DAA 24 and to the telephone line connector 26.

When the use manipulates a key pad of the telephone (NP12) at sender side according to the voice guide message, a dual tone multifrequency DTMF tone is generated to be converted to a digital signal by the second CODEC 22 through the DAA 24 and to be input to the digital signal processor 20. The digital signal processor 20 detects the digitally-converted tone signal to discriminate which key input the tone signal corresponds to an notifies same to the MCU 28. The MCU 28 can discriminates the connection request type of the telephone (NP12) of the opposite party {communication request with internet based telephone of the MCU 28, in other words, general telephone communication mode, or communication request with other internet telephone (first gateway mode)} and a communication request with general telephone via other internet based telephone (in other words, second gateway communication mode). At this time, it is presumed that the connection request by the telephone (NP12) of the opposite party is a communication request with other internet based telephone (IP2) (first gateway communication mode).

At this time, the MCU 28 does not activate a bell signal generator (not shown) to establish a first gateway mode, such that an admission request message including an identification number of the internet based telephone (IP2) of the opposite party input by a user of the telephone (NP12) at the sender side is transmitted to the call server (CS, see FIG. 1) via the input/output buffer 30 utilizing UDP protocol.

Successively, when the MCU 28 receives from the call server (CS) an admission confirmation message including IP address against the internet based telephone (IP2) of the opposite party, the MCU 28 executes an operation for setting up a communication route as explained in chapter (2.1.). The MCU 28 then controls the digital signal processor 20 to send an imaginary ringing tone via the second CODEC 22, DAA 24, telephone line connector 26 to the telephone (NP22) to prevent the user of the telephone (NP2) at the sender side from feeling tedious, such that the user of the telephone at sender side is made to know that a communication connection is tried with the internet based telephone (IP2) of the opposite party.

Successively, when the communication route is secured with the internet based telephone (IP2) of the opposite party, the MCU 28 controls the digital signal processor 20 to terminate generation of the imaginary ringing tone.

The analogue voice signal from the telephone (NP12) at transmitter side is converted to a digitally compressed coded voice signal through the telephone line connector 26, DAA 24, second CODEC 22 and the digital signal processor 20 to be input to the MCU 28.

The MCU 28, being aware of the fact that signal is the communication (first gateway communication mode) through the internet network, sends a voice data to compressed coded voice signal packeted by using RTP protocol on TCT/IP to the internet based telephone (IP2) of the opposite party through the input/output buffer 30 and the internet network.

Meanwhile, the voice data signal from the internet based telephone (IP2) of the opposite party is sent to the MCU 28 in pcket format on TCT/IP through the internet network and the input/output buffer 30. The MCU 28 decomposes the packet data to confirm whether the corresponding packet voice data has been transmitted from the internet based telephone (IP2) of the opposite party paged from the general telephone (NP12) through the internet based telephone (IP12) of the MCU 28 and send the decomposed compressed coded voice signal to the digital signal processor 20. The digital signal processor 20 stretches and decodes the compressed coded signal to send same to the second CODEC 22. Successively, the decoded voice signal of the opposite party is converted to an analogue voice signal by the second CODEC 22 to be output to the telephone (NP12) at the sender side through the DAA 24 and the telephone line connector 26.

When the communication is disconnected by the telephone (NP12) at the sender side, end tone is transmitted to the digital signal connector 20 via telephone line connector 26, DAA 24 and the second CODEC 22. The end tone is detected by the digital signal processor 20 and the telephone (NP12) at the sender side notifies to the MCU 28 that the communication therethrough is terminated.

Successively, the MCU 28 outputs the admission release message on TCP protocol to notify that connection to the internet based telephone (IP2) of the opposite party is released.

Meanwhile, when the communication is first terminated by the internet based telephone (IP2) of the opposite party, the MCU 28 analyzes the admission release message received from the internet based telephone (IP2) of the opposite party on TCP to recognize that communication between the general telephone (NP12) via its own internet based telephone and the internet based telephone of the opposite party (IP2) is terminated, and controls the digital signal processor 20 to output an imaginary end tone to the telephone (NP12) at the sender side via the second CODEC 22, DAA 24 and the telephone line connector 26. The user of the telephone at the sender side recognizes that the communication is terminated.

3.2. Communication request from a general telephone to another general telephone via a certain internet based telephone and through another internet based telephone (second gateway communication mode)

The present communication mode has a similarity with the first gateway communication mode is chapter (3.1.) in that information is transmitted about a general telephone at receiving end, which can be easily understood by the second internet communication mode in chapter (2.2.) such that explanation thereto is omitted.

3.3. Communication request from another internet based telephone to a general telephone via a certain internet based telephone Next, a communication connection from internet based telephone (Ip2) to a general telephone (by way of example, NP12) via internet based telephone (Ip1) will be explained.

When the MCU 28 of the internet based telephone (IP1) receives in TCP protocol format a call signaling message (in other words, call setup request message) of the internet based telephone (IP2) of the opposite party input from the input/output buffer 30, a destination identification code {IP address of internet based telephone (IP1)} is analyzed from a sender identification code {in other words, IP address of internet based telephone (IP2)} contained in the message and recognition is made as to whether the currently-input call signaling message is a communication request between the certain internet based telephone (IP1) and the internet based telephone (IP2). Next, an operation for securing a communication channel with the internet based telephone (IP2) of the opposite party via mutual internet network is performed.

In the intervening period, transmission and receipt of call signaling message with the call server (CS) is realized, where the call server (CS) transmits information indicating that a communication destination of the internet based telephone (IP2) of the opposite party is the general telephone (NP12) via the certain internet based telephone (IP1).

Successively, when information (INFO) message including a telephone number of the general telephone (NP12) at destination side is input on TCP protocol, the MCU 28 establishes a third gateway communication mode and controls the DAA to make possible a connectable state with the PSTN (in other words, the DAA 24 is established at HOOK-OFF mode). The MCU 28 confirms the telephone number of the general telephone at the destination side contained in the information (INFO) message to control the digital signal processor 20 in order to generate a digital tone signal corresponding to the telephone number.

The digital tone signal is converted to an analogue signal by the second CODEC 22 to be sent to a switchboard of PSTN through the DAA 24 and the telephone line connector 26. A communication route with the telephone (NP12) at destination is formed by a communication route forming procedure between the switchboard and the telephone (NP12) at destination side.

When the communication route between the internet based telephone (IP2) at sender side and the telephone (NP12) at receiving end via the internet based telephone (IP1) is obtained, operation of the internet based telephone (IP1) is the same as that of chapter (3.1.) such that explanation thereto is omitted.

4. Dual channel communication mode

Figure 7:
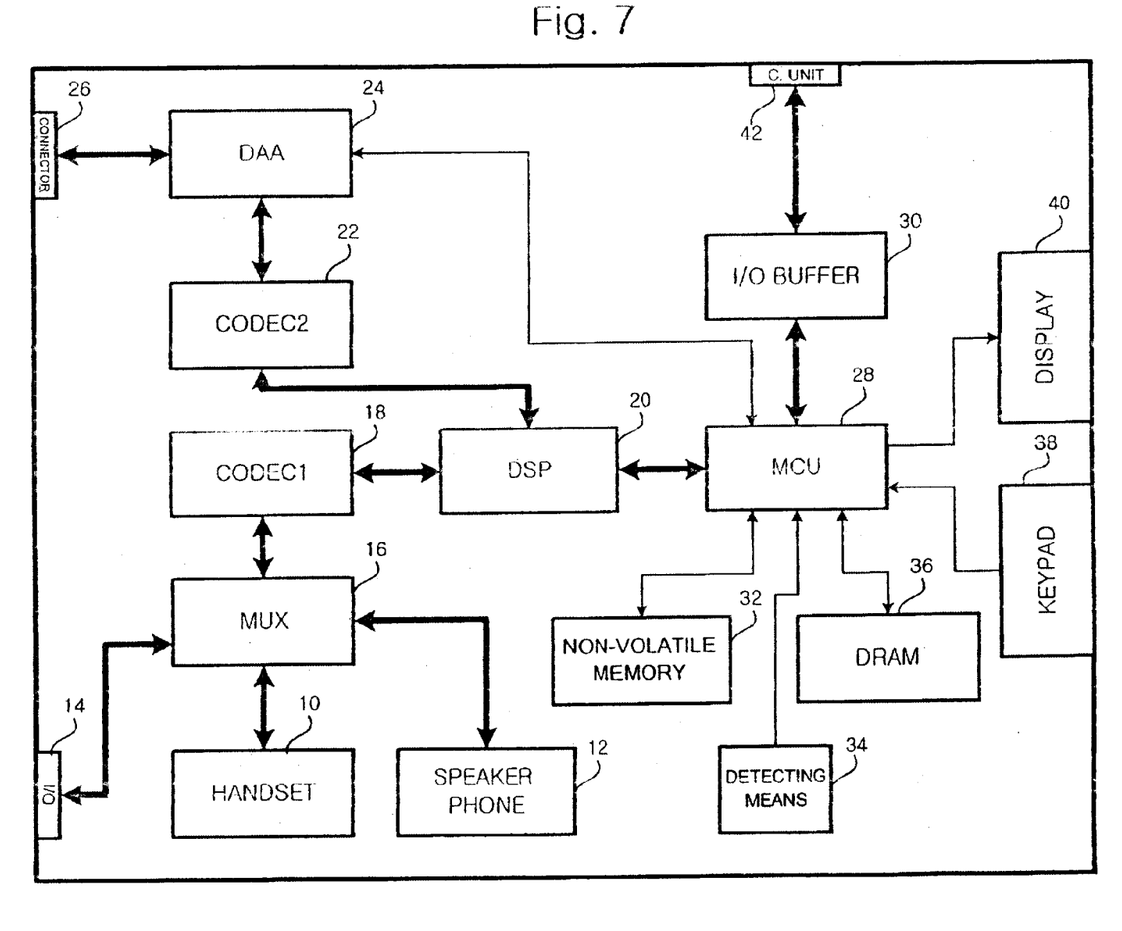
FIG. 7 is a signal flow chart of a dual channel communication mode for enabling a communication connection between an internet based telephone and another internet telephone and a communication connection between a general analogue telephone connected to the internet based telephone according to the present invention connected via public switched telephone network and a third internet based telephone.

Next, referring to FIGS. 1 and 7, a dual channel communication mode of internet based telephone according to the present invention will be explained.

The present communication mode is provided with the digital signal processor 20 according to the present invention in a dual channel method, which is made possible by the fact that signal transmission and receipt between the first CODEC 18 and the digital signal processor 20, and signal transmission and receipt between the second CODEC 22 and the digital signal processor 20 are respectively realized in different time slots.

In FIG. 1, when the internet based telephone (IP1) is in communication with another internet based telephone (IP2) or general telephone (NP22) via the present telephone, a dual communication channel can be formed by communication request of other internet based telephone (IPn) via the internet based telephone (IP1) from the general telephone (NP12) or of general telephone (NP2n) via the telephone (IP2). In operation of this case, operation of internet based communication mode explained in chapter (2) and the gateway communication mode explained in chapter (3) are simultaneously executed and can be understood by combination of the explanation, such that further explanation thereto is omitted.

5. Others 5.1. Case where internet based telephone of the opposite party desired to be communication with is busy A message indicating that internet based telephone of the opposite party is busy is received by a call server when the call server requests a communication, or a message from the internet based telephone of the opposite party indicating that the internet based telephone of the opposite party is busy is received when the internet based telephone of the opposite party is in the process of call connection signaling.

Successively, an MCU of internet based telephone at sender side controls a digital signal processor to generate an imaginary busy tone notifying to a user that the line is busy.

5.2. Case where internet based telephone of the opposite party is busy of is already performing a gateway mode when a communication connection via a certain internet based telephone from general telephone is desired.

A message indicating that internet based telephone of the opposite party is busy or performing a gateway communication mode is received by a call server when a communication is requested by the call server, or a message is received from the internet based telephone of the opposite party indicating that line is busy or gateway communication mode is performed during call connection signaling with the internet based telephone of the opposite party.

Successively, an MCU of internet based telephone at sender side controls a digital signal processor to generate and output an imaginary busy tone notifying to telephone at sender side that telephone at receiving end requested for communication is busy.

Meanwhile, it should be noted that although the invention has been described in detail with reference to its presently preferred embodiments, it will be understood by one of ordinary skill in the are that various modifications can be made, without departing from the spirit and scope of the invention. Accordingly, it is not intended that the invention be limited, except as by the appended claims.

As apparent from the foregoing, there is an advantage in the internet based telephone apparatus thus described according to the present invention in that the internet based telephone apparatus enables a communication with general telephone through PSTN< and with another internet based telephone through internet network, thereby making it possible to embody a full high-quality telephone-to-telephone type of internet based telephone.

There is another advantage in that a gateway function can be performed where communication can be possible between a general telephone connected via PSTN with another internet based telephone connected through internet network without separate internet telephone gateway installed between the internet network and PSTN, such that a high quality internet based telephone communication with a person having a general telephone on an outside duty can be embodied via internet telephone installed at an office.

There is still another advantage in the a dual channel communication can be performed for connection and communication with a third internet based telephone when there is a communication connection between a general telephone connected via PSTN and a second internet based telephone connected through internet network, such hat an internet based telephone set up at an office can be reached by another person using a general telephone via the internet based telephone even though the internet based telephone is busy with another internet based telephone, thereby enabling a high quality internet based telephone communication.

What is claimed is:

1. An internet based telephone apparatus, the apparatus comprising:

voice input/output means for inputting and outputting a user's voice and voice signal of the opposite party;

first signal converting means for converting the user's voice to a digital voice signal;

transmitting/receiving means for forming a first communication route with a telephone of a first opposite party through internet network, packeting the user's digital voice signal to send the user's digital voice signal to the telephone of the first opposite party through the first communication route and for including a voice signal from the telephone of the first opposite party received through the first communication route;

control means for controlling the transmitting/receiving means;

second signal converting means for converting the decomposed voice digital signal to an analogue signal to output same to the voice input/output means; and a public switched telephone network (PSTN) connection means for forming a communication route with PSTN and third signal converting means for converting analogue signal including analogue voice signal from the PSTN to a digital signal, wherein the transmitting/receiving means further comprises fourth signal converting means for forming a second communication route with a telephone of a second opposite party through internet network, packeting a digital voice signal from the third signal converting means to send same to the telephone of the second opposite party through the second communication route, decomposing packet data including the voice signal from the telephone of the second opposite party received through the second communication route, and converting the decomposed voice digital signal from the second communication route to an analogue signal to output same to the PSTN connection means through the PSTN.

2. The apparatus as defined in claim 1 further comprising storing means for storing control program of the transmitting/receiving means and the control means.

3. The apparatus as defined in claim 1 further comprising key input means including a number key and various function keys.

4. The apparatus as defined in claims 1, 2, 3, wherein the voice input/output means comprises:

a handset having a transmitting/receiving function;

a speakerphone;

an external voice input/output terminal; and communication internet detecting means for detecting a communication intention of a user according to operation state thereof.

5. The apparatus as defined in claim 4, wherein the control means controls the transmitting/receiving means according to a user's selection to form a communication route with an internet based telephone of the opposite party or to form a communication route with a public switched telephone network PSTN through the third and fourth signal converting means and PSTN connecting means.

6. The apparatus as defined in claim 1, wherein the transmitting/receiving means simultaneously forms the first communication route and the second communication route.

7. The apparatus as defined in claim 5, wherein the user's selection is realized by a certain particular key input according o voice guide.

8. The apparatus as defined in claim 5, wherein the transmitting/receiving means further comprises a tone signal generator for generating a dual tone multifrequency DTMF signal, and the control means controls the tone signal generator according to key input corresponding to a telephone number at receiving end by a user when communication is made through the PSTN.

9. The apparatus as defined in claim 4, wherein the PSTN connecting means further comprises a communication request detecting unit for detecting a communication request signal from the PSTN, and the transmitting/receiving means further comprises a tone signal detecting unit for detecting a DTMF signal while the control means controls the transmitting/receiving means when a communication request is detected by the communication request detecting unit to form a communication route with the PSTN and to output a voice guide for inputting a certain particular key as to whether the communication request is through the apparatus or with another telephone through the internet network via the apparatus, and to establish a general telephone communication mode and a gateway communication mode according to the certain particular key input detected by the tone signal detecting unit.

10. The apparatus as defined in claim 9, wherein the control means generates a telephone bell signal in the general telephone communication mode and controls the transmitting/receiving means according to detection result of the communication intention detecting means to form a communication route through the PSTN.

11. The apparatus as defined in claim 9, wherein the control means controls the transmitting/receiving means with a telephone number of the opposite party detected by the tone signal detecting unit in the gateway communication mode to controllably form a communication route with the telephone of the opposite party through the internet network and the PSTN which has requested a communication.

12. The apparatus as defined in claim 4, wherein the transmitting/receiving means analyzes a communication request signal received from the internet network while the control means establishes an internet based communication mode when the analyzed result by the transmitting/receiving means is a communication request with the apparatus, and establishes a gateway communication mode when the result shows a communication request with another telephone through the PSTN via the apparatus.

13. The apparatus as defined in claim 12, wherein the control means controls to generate a telephone bell signal in the internet communication mode, and controls the transmitting/receiving means according to the detected result of the communication intention detecting means to controllably form a communication route with voice input/output means and telephone of the opposite party through the internet network.

14. The apparatus as defined in claim 12, wherein the transmitting/receiving means further comprises a tone signal generating unit for generating a DTMF signal, and the control means controls the tone signal generating unit according to telephone number at receiving side included in the communication request signal in the gateway communication mode to generate a tone signal and to output same through the fourth signal converting means and PSTN connecting means.

15. The apparatus as defined in any one of claim 1, 2, 3, or 5–14, wherein the transmitting/receiving means comprises:
   an encoding unit for compressively encoding a voice signal transmitted through the internet network; and
   a decoding unit for stretching and decoding the compressed coded voice signal received from the internet network.

16. The apparatus as defined in claim 4, wherein the transmitting/receiving means comprises:
   an encoding unit for compressively encoding the voice signal transmitted through the internet network; and
   a decoding unit for stretching and decoding the compressed coded voice signal received from the internet network.

17. An internet based telephone apparatus, the apparatus comprising:
   voice input/output means for inputting and outputting a user's voice and a voice signal of the opposite party;
   first communication route forming means for forming a communication route with a general telephone through PSTN;
   second communication route forming means for forming a communication route with an internet based telephone of the opposite party through the internet network;
   third communication route forming means for a third communication route with the voice input/output means and the communication-requested general telephone according to communication request from the general telephone through PSTN; and
   fourth communication route forming means for forming a fourth communication route with the communication-requested general telephone according to communication request from general telephone through PSTN and internet based telephone of the opposite party through the internet network;
   wherein said apparatus is able to form the fourth communication route in the course of forming the second communication route and is able to form the second communication route in the course of forming the fourth communication route.

18. The apparatus as defined in claim 17 further comprising:
   fifth communication route forming means for forming a fifth communication route with the voice input/output means and the communication-requested internet based telephone of the opposite party according to the communication request form the internet based telephone of the opposite party through the internet network; and
   sixth communication route forming means for forming a sixth communication route with general telephone through PSTN and the communication-requested internet based telephone of the opposite party according to communication request from the internet based telephone of the opposite party through the internet network.

19. The apparatus as defined in claim 18 being able to form the sixth communication route in the course of forming the second communication route and being able to form the second communication route in the course of forming the sixth communication route.

20. The apparatus as defined in claim 18 being able to form the fourth communication route in the course of forming the fifth communication route and being able to form the fifth communication route in the course of forming the fourth communication route.

21. The apparatus as defined in claim 18 being able to form the sixth communication route in the course of forming the fifth communication route and being able to form the fifth communication route in the course of forming the sixth communication route.

22. The apparatus as defined in claim 18, wherein the second, fourth, fifth and sixth communication route forming means comprise:
   an encoding unit for compressively encoding a voice signal sent to the internet network; and
   a decoding unit for stretching and decoding the compressed coded voice signal received from the internet network.

* * * * *